United States Patent [19]

Cilek

[11] 4,163,065
[45] Jul. 31, 1979

[54] EDIBLE INTERLOCKED COMPONENTS FOR CEREMONIAL INGESTION

[75] Inventor: Wallace F. Cilek, St. Paul, Minn.

[73] Assignees: Eugene T. Cilek; Gregory J. Cilek, both of St. Paul, Minn.; part interest to each

[21] Appl. No.: 898,451

[22] Filed: Apr. 20, 1978

Related U.S. Application Data

[63] Continuation-in-part of Ser. No. 770,397, Feb. 22, 1977, abandoned.

[51] Int. Cl.$^2$ ................... A21D 13/00; A23L 2/02
[52] U.S. Cl. ............................. 426/94; D1/15; 426/89; 426/99; 426/103; 426/104; 426/590; 426/592
[58] Field of Search .................. 426/89–94, 426/104, 102, 592, 96, 98, 99, 103, 274, 275, 3, 590, 281–284, 549, 556, 560, 120, 138, 573, 576; 428/3; 424/14, 16, 37; D31/21.1–21.3; D1/15

[56] References Cited

U.S. PATENT DOCUMENTS

| | | | |
|---|---|---|---|
| 1,893,842 | 1/1933 | Nehf | 426/102 X |
| 2,278,466 | 4/1942 | Musher | 426/103 X |
| 2,298,278 | 10/1942 | Clark | 426/94 |
| 3,041,289 | 6/1962 | Katchex et al. | 424/16 X |
| 3,514,029 | 5/1970 | Powell | 206/19 X |
| 3,551,161 | 12/1970 | Whitestone | 426/92 |
| 3,664,963 | 5/1972 | Pasin | 426/98 X |
| 3,718,481 | 2/1973 | Joaquin | 426/92 |
| 3,860,733 | 1/1975 | Morse et al. | 426/302 |
| 3,867,556 | 2/1975 | Barragh et al. | 426/98 |
| 3,914,439 | 10/1975 | Graves | 426/98 X |
| 3,971,852 | 7/1976 | Brenner et al. | 426/89 X |
| 3,982,009 | 9/1976 | Slangan et al. | 426/3 |

FOREIGN PATENT DOCUMENTS

| | | | |
|---|---|---|---|
| 1923555 | 11/1970 | Fed. Rep. of Germany | 426/103 |
| 465242 | 5/1937 | United Kingdom | 426/294 |

Primary Examiner—Steven L. Weinstein
Attorney, Agent, or Firm—Robert C. Baker

[57] ABSTRACT

The ceremonial articles are storable and consist of two components or parts united together. In the preferred embodiments, the article is wholly edible and the two components are interlocked and united together with each component visible to the naked eye. One component is crisp unleavened bread material. The other is a fruit-flavored capsule locked in position in the article by the bread material and outwardly from which at least 80 percent of the total volume of the bread material extends as a substantially flat planar structure of wafer-thin thickness. The bread material of the flat planar structure occupies more than 75 percent of the total area of a two-dimensional plane struck through the article within and bisecting the flat planar structure. In another embodiment, the two parts of the article are disengagably united together. One part is bread material; and the other is a two-walled structure providing a pocket for the bread and an envelope within which fruit-flavored liquid is sealed but made accessible for ingestion by biting the envelope to rupture it.

9 Claims, 14 Drawing Figures

EDIBLE INTERLOCKED COMPONENTS FOR CEREMONIAL INGESTION

This application is a continuation-in-part of my application Ser. No. 770,397, filed Feb. 22, 1977, now abandoned.

This invention relates to new storable articles for ceremonial religious use, especially religious Communion use. The articles consist of two components or parts united together in a special manner to facilitate convenience and the impact of use.

When the variety of components or materials employed in the sundry religious practices of man is considered in the broadest and essentially unlimited sense, almost all materials of nature might superficially seem to qualify; and in that sense, the following United States Pat. Nos. are of general interest: Witsil 248,247; Liebich 943,945; Johnson 1,054,422; Carpenter 1,163,066; Griffith 1,518,737; Nehf 1,893,842; Musher 2,278,466; Clark 2,298,278; Silver 2,531,536; Katchen et al 3,041,289; Durst 3,431,112; Powell 3,514,029; Pasin 3,664,963; Scharschmidt 3,676,151; Brooking et al 3,851,083; Morse et al 3,860,733; Darragh 3,867,556; Graves 3,914,439; Brenner et al 3,971,852; and Slangan et al 3,982,009; plus the foreign references as follows: West German 1970 Offenlegungsschrift No. 1,923,555, and Great Britain 1937 Pat. No. 465,242.

The present invention is limited to storable articles of specialized and limited nature which satisfy predetermined traditional criteria and yet also provide religious authorities with a solution to the problem posed by dispensing the components to larger and larger groups with reliable efficiency and the avoidance of distressing accidents while also retaining all the propriety and significance critical to the ceremony. It is in this sense that the aforenoted prior art proves entirely inadequate.

The main embodiment of this invention provides a storable wholly edible article for ceremonial religious ingestion. The article consists of two components of discrete shape interlocked and unified together, with each component visible to the naked eye on visual inspection of the article. One of the components consists of crisp unleavened bread material. The other consists of a single unitary structure in the form of a capsule of fruit-flavored non-bread material locked in position in the article by the bread material and outwardly from which at least 80 percent of the total volume of the bread material in the article extends as a substantially flat planar structure of wafer-thin thickness. The bread material of the flat planar structure occupies more than 75 percent of the total area of a two-dimensional plane struck through the total article within the flat planar structure of the article. The unification of the two components in terms of the structure of the unification is especially critical according to this invention and is accomplished in a manner which retains the discrete character of the components, despite their differences in size and shape, and despite the ultra thin character of the unleavened bread wafer.

In the alternate embodiment of the invention, the article consists essentially of two relatively flat discrete parts disengagably united together. One part consists of edible bread material and the other part consists of a two-walled structure having certain special features. The walls are opposite each other and are sealed together along lines of seal so as to define an envelope enclosure therebetween in combination with an adjacent pocket recess therebetween. The opening into the pocket recess is at a peripheral edge of the two-walled structure. The bread material is removably lodged at least partially within the pocket recess. The envelope enclosure has an edible fruit-flavored liquid sealed within it and is rupturable by biting at an edge portion of it for withdrawal of the liquid therefrom.

Additional features and benefits and advantages of this invention will become evident from the disclosure to follow.

The invention is described by reference to a drawing made a part hereof, wherein.

Figure 13:
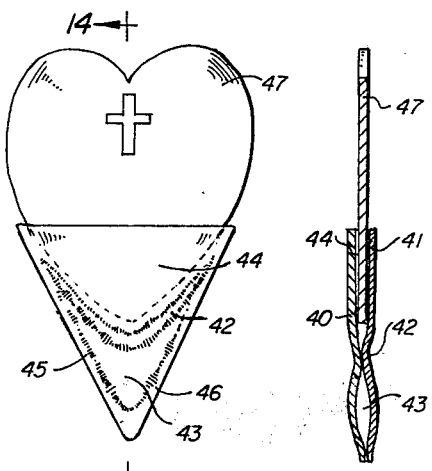
Figure 14:
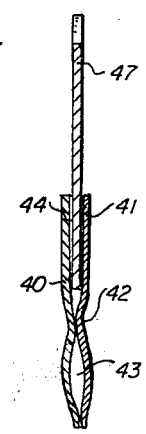

FIGS. 9 through 12, inclusive, are schematic cross-sectional views through illustrative capsules according to the invention;

FIG. 13 is a schematic top elevational view of an article according to the invention consisting essentially of two relatively flat discrete parts disengagably united together; and FIG. 14 is a schematic cross-sectional view taken on line 14—14 of FIG. 13, particularly illustrating the details of structure for the two parts which are disengagably united.

A common feature for all the showings in FIGS. 1 through 12, inclusive, is the fact of entire edibility. The articles of FIGS. 1 through 8, inclusive, consist of two components interlocked and unified together. Each component is of discrete shape and each is visible to the naked eye on visual inspection of the article. One of the components consists of crisp unleavened bread material; the other consists of a single unitary structure in the form of a capsule of fruit-flavored non-bread material. It is critical that the article contain only one such capsule. The capsule also must be visually apparent in the article.

Unleavened bread material is commonly recognized as bread formed using a flour of starch base without employing a leaven or yeast or similar material to cause fermentation in the dough. Such bread, from a chemical standpoint, consists essentially of starch. It is very crisp after the moisture of its dough is removed, as by baking. The color exhibited by it is of a light tone, toward white, although cream colors are not entirely uncommon. The bread material is always lighter in color than the edible capsule employed, and is therefore visually distinct from the capsule.

The fruit-flavored non-bread material most preferably employed is that subjected to some fermentation; and wine of the grape is an ideal fruit-flavored material. Thus the preferred fruit-flavored material includes some ethyl alcohol. However, non-fermented liquids (such as grape juice), or saliva-dispersible solids, having any of a variety of fruit flavors are acceptable to many religious groups and are useful in the practice of this invention. The critical feature with respect to the fruit-flavored non-bread material is that is must be in discrete edible capsule form for the articles illustrated in FIGS. 1 through 12, inclusive. Colorwise, the capsules are relatively dark, usually in the red range, but may be blue or any other darker color than the bread material.

Figure 1:
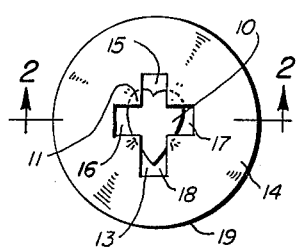
FIG. 1 is a schematic top elevational view of a wholly edible article according to the invention, consisting of a wafer of unleavened bread having a capsule held by it.
Figure 2:
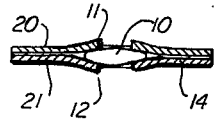
FIG. 2 is a cross-sectional view taken on line 2—2 of FIG. 1, illustrating the mode by which the wafer of bread holds the capsule in position.
Figure 9:
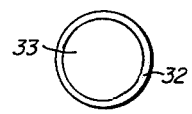

Referring particularly to FIGS. 1 and 2, the capsule 10 of fruit-flavored non-bread material is in the shape of a relatively flattened heart mass. It is lodged in the total article by lips 11 and 12 of crisp bread material extending over a portion of the capsule on opposite faces of the capsule and at spaced intervals about the periphery of the relatively flattened capsule. There are four bread lips 11 on the face and four 12 on the back of the flattened capsule; and each lip is located at the indent corners of a cross structure 13 of open character in the bread material. The lips 11 and 12 leave at least a substantial portion of capsule 10 uncovered and exposed to direct view for visual observation. The bread material of the lips 11 and 12 locks the capsule in position; but at least 80 percent (even at least 90 percent) of the total volume of the bread material in the article extends outwardly from the capsule 10 as a substantially flat planar structure 14 of wafer-thin thickness (never over three millimeter thickness and usually not over two millimeters).

Further to be noted is the fact that several void or see-through spaces 15, 16, 17, and 18 are present between the peripheral edges of the capsule 10 and the bread material of the planar structure 14.

The planar structure 14 dominates the article in terms of the area covered by the planar structure as compared to the area covered by the capsule 10. When area is considered from the standpoint of a two-dimensional single plane struck through the article within the plane of, and bisecting, the planar structure 14, the area of that plane within the confines of the perimeter edge 19 of the article is at least 75 percent (or even more than 85 percent) accounted for by the bread material of the planar structure 14. Stated another way, the bread material of the flat planar structure 14 occupies more that 75 percent of the total area of a two-dimensional plane struck through the article at a location within the flat planar structure.

To be emphasized is the fact that the capsule 10 is at a location in the article such that it is intersected (and even bisected) by the aforesaid two-dimensional plane. Further, the bread material extends out of the flat wafer-thin planar structure; and lips of the bread overlap the capsule 10 on opposite sides thereof as the same is viewed or looked at from opposite sides of the two-dimensional plane. A significant feature of the article of FIGS. 1 and 2 also is that with respect to the void spaces 15, 16, 17, and 18 about the capsule and between it and the flat planar structure. These void spaces are such that they are intersected (or are in) the aforenoted two-dimensional plane. The greatest thickness of the article is at the location of the capsule 10; all other portions do not exceed two millimeters in thickness.

Manufacture of the article of FIGS. 1 and 2 may be conveniently accomplished in at least two different ways. One way involves laminating together two thin films 20 and 21 of the bread material while in a moist or plastic state (before baking or drying) and after they have had the cross shape 13 removed therefrom. The capsule 10 is positioned as shown in the drawing between the films 20 and 21 while they are yet plastic; and the lips 11 and 12 thus conform to the surface contour of the capsule at their locations of contact. Bread material of the films 20 and 21, while in plastic condition, is actually pressed into a unitary mass in the portion forming the planar structure 14; and the showing of FIG. 2 is for the purpose of schematically illustrating the fact that the planar structure may be formed by uniting two such films, as aforenoted. An alternate method of manufacture involves placing the capsule 10 in a mold cavity having walls and filled areas defining the total exterior shape of the article and then injecting the bread material therein and baking or drying it before removal of the article from the cavity. The resulting unleavened bread material is very crisp and friable, which would suggest that it would perform only a weak holding function for capsule 10. However, the capsule is firmly locked in the article; and this result may be explained by the fact that the interface between the bread lips and the capsule is essentially perfectly snug and void free, having been formed by molding or pressing of the plastic bread into snug relationship on the capsule before the bread is embrittled. The result is that both the capsule and the bread, at the interface areas, contribute to the interlocking between them.

Figure 3:
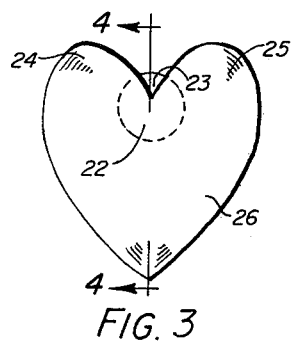
FIGS. 3 and 4 are schematic top elevational and cross-sectional views, respectively, of an alternate structural arrangement for a wholly edible article of the invention.
Figure 4:
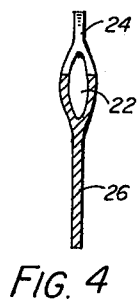

In FIGS. 3 and 4, the capsule 22 is placed at the location of the indented cusp between the large lobs of a heart shaped structure, with a small portion 23 of the capsule exposed to view between lobs 24 and 25. The entire heart is formed of the bread material which, here again, extends outwardly from the capsule as a flat planar structure 26 in which at least 80 percent of the total volume of the bread material is located. In FIG. 3, however, a portion of the outermost perimeter of the article, as viewed or considered in the plane of the planar structure 26, is defined by the exposed edge 23 of the capsule 22.

Figure 5:
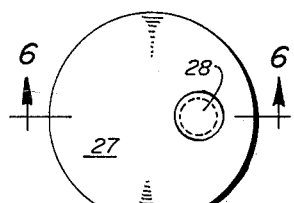
FIGS. 5 and 6 are schematic top elevational and cross-sectional views, respectively, of a combination of the invention where the capsule is interlocked within a void space or opening in the planar structure of the bread wafer.
Figure 6:
Figure 10:
Figure 12:
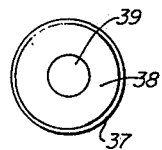

The structure of FIGS. 5 and 6 illustrates a combination where 100 percent of the bread material is in the form of the planar structure 27 not over two millimeters thick; and the capsule 28 assumes a shape analogous to a flattened or squashed hour-glass as it is interlocked with the bread. Stated another way, the capsule has a constricted waist portion with bulbous enlargements on opposite sides of its waist part. The planar structure of bread is in snug abutment against the waist portion and extends outwardly therefrom.

Figure 7:
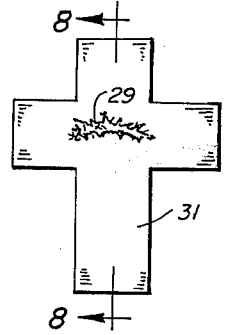
FIGS. 7 and 8 are schematic top elevational and cross-sectional views, respectively, of a further alternate embodiment of the invention where the unitary article is wholly edible and combines the two components of discrete shape interlocked together.
Figure 8:
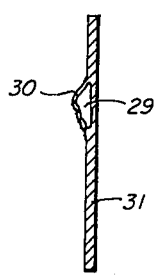

The dominant variation illustrated in FIGS. 7 and 8 is that of completely enclosing the capsule 29, suitably in the shape of a crown of thorns, within a thin film covering 30 of bread material. The thin enclosure 30 of bread material is sufficiently translucent to permit visual observation or identification of the darker colored capsule within the mass. Most of the bread material extends as the planar structure 31, which is illustrated in FIG. 7 to define the shape of a cross.

A variety of capsule structures may be employed in practicing the invention. Useful capsule structures have a predetermined shape. Stated another way, the useful capsule structures are not mere masses of plastic material worked and shaped to fill void areas. Useful capsules are incorporated into the article as a unit structure having a definite preformed shape. They need not be rigid and brittle, but each is at least a discrete structural unit, not a mere mass of spreadable matter. Capsules may be somewhat flexible.

Capsules (see FIG. 9) having an exterior coating or integument of dry or essentially moisture-free saliva-dispersible material surrounding an interior liquid of oil base are useful. The outer integument or covering may consist essentially of proteins, gelatins, or analogous materials insoluble in the oily or oil base material selected as the carrier or vehicle for the fruit flavor, whether the fruit flavor is fermented or unfermented. Oils or oil base material such as corn oil, peanut oil and the like may be used. Natural essences of fruit, as derived by evaporation of the water from natural fruits, such as grapes, are useful to impart a dominant fruit flavor to an oil.

Capsules (see FIG. 10) consisting essentially of compacted crystals 33 of dry (or substantially moisture-free) and substantially non-hygroscopic saliva-dispersible material are useful. Such crystalline material may comprise a variety of fruit sugars, especially natural fruit sugars, and related chemical structures having a fruity taste.

Figure 11:
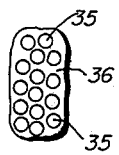

As illustrated in FIG. 11, a multiplicity of discrete small capsules or microcapsules 35 containing or consisting of fruit sugars or the like may be embedded in a matrix 36 of wax, edible shellac, gelatin, protein, resin, gum arabic, carboxymethyl cellulose, or other edible integument-type material. A mass of smaller capsules may alternatively be surrounded by a simple outer integument or covering, with or without an interstitial vehicle or filler (e.g., a stearate or oil). Illustratively, microcapsules of wine (or other liquid containing ethyl alcohol) enclosed within a gelatin skin may be embedded in a matrix or compacted within an outer integument, as aforenoted, to form a composite unitary capsule useful in the practice of the invention.

Complex capsule structures (see FIG. 12) may comprise an outer integument or covering 37 enclosing a fluid material 38 (such as an oil base material as aforediscussed), within which an interior capsule 39 or multiplicity of the same is located. The interior capsule or capsules may be in floating relationship inside the outer integument. Interior capsules of wax integument about a fruit sugar may be employed, as may crystalline fruit sugars without a waxy or other integument about them.

The essential feature of the capsules is that they possess the fruit-flavor; and this essence may be either fermented or non-fermented, with or without an alcoholic content of low percentage such as that characteristic for wines.

The embodiment of the invention illustrated in FIGS. 13 and 14 requires a special two-walled structure wherein its two walls 40 and 41 are opposite each other and are sealed together along certain lines of seal. The main line 42 of seal between the two walls serves to separate the lower portion 43 from the upper portion 44 of the two-walled structure. The outer edges 45 and 46 of the two walls 40 and 41 are sealed together to form a V-shaped article in the form chosen for illustration by drawing. More important, the lower portion 43, by virtue of the seals 45 and 46 and the main seal 42, is completely sealed and forms an envelope within which liquid fruit-flavored material as aforediscussed is sealed against escape. The fruit-flavored material may be fermented or non-fermented, a wine or a fresh juice, or a specially prepared juice. Grape wine or juice is ideal.

The upper portion 44 is separated from the lower portion 43 by the line of seal 42. Seal 42, and the edge seals 45 and 46 as extending along the edges of the upper part 44, causes the upper part 44 to form a pocket recess having an opening along its uppermost edge. Within the pocket recess is removably lodged at least a portion of the bread material 47, which preferably is of a perimeter shape (at least in its portion lodged in the pocket recess) which more or less mates or matches the shape of the pocket recess, as illustrated. The bread material is thus disengagably united with the two-walled structure, but conveniently removable therefrom for separate ingestion.

A feature of the article illustrated in FIGS. 13 and 14 is that its two-walled structure of envelope and pocket recess may be formed using non-edible sealable plastic films which are substantially impervious to the passage or migration of the wine or fruit juice therethrough. The films useful in the practice of this embodiment include for example, polyvinylidene chloride films, polyethylene terephthalate films, polypropylene films and laminates of such films with other materials such as, for example, heat-sealable polyethylene. The envelope employed must be rupturable by biting between the teeth; and to this end it is necessary to either employ films which en toto are relatively easily fractured by biting action or to employ a fracturable section of film or a rupturable weakness of seal at a point portion of the envelope such as at the lowermost tip portion of that envelope illustrated in the drawing. The liquid in the envelope is easily withdrawn therefrom after rupture; and the two-walled plastic portion is then discarded.

There is thus provided new easily stored and conveniently used combination articles which, for the first time insofar as is known, equip religious authorities with needed means for safe and reliable distribution of elements to communicants without the likelihood of distressing accidents and with a visual completeness long desired.

That which is claimed is:

1. A storable wholly edible article for ceremonial religious ingestion, said article consisting of two components of discrete shape interlocked and unified together with each component visible to the naked eye on visual inspection of said article, one of said components consisting of crisp unleavened bread material and the other of said components consisting of a single unitary structure in the form of a capsule of fruit-flavored non-bread material, said capsule being of a darker color than said bread material and having a predetermined shape, at least 80 percent of the total volume of said bread material in said article being in the form of a substantially flat planar structure of wafer-thin thickness extending outwardly from said capsule, said bread material of said flat wafer-thin planar structure occupying more than 75 percent of the total area of a two-dimensional plane struck through said article at a location within and bisecting said flat wafer-thin planar structure, said capsule being at a location intersected by said two-dimensional plane, at least a portion of said bread material of said article extending out of said flat wafer-thin planar structure and snugly overlapping said capsule on opposite sides thereof as viewed from opposite sides of said two-dimensional plane, such that said capsule is locked in position in said article, at least a portion of said capsule being exposed to direct view and not covered by any said bread material, the thickness of said article being greatest at the location of said capsule, all other portions of said article being of wafer-thin thickness not exceeding two millimeters.

2. The article of claim 1 having a void see-through space between at least a peripheral portion of said capsule an said bread material of said flat wafer-thin planar structure, said void see-through space being intersected by said two-dimensional plane.

3. The article of claim 1 wherein said fruit-flavored non-bread material consists essentially of an oil base fluid material and wherein said capsule includes an exterior integument consisting essentially of a dry Saliva-dispersible material.

4. The article of claim 1 wherein said capsule of fruit-flavored non-bread material consists essentially of solid dry saliva-dispersible crystalline material.

5. The article of claim 1 wherein said capsule comprises an outer integument enclosing a multiplicity of discrete smaller capsules within which said fruit-flavored non-bread material is sealed.

6. The article of claim 1 wherein said capsule comprises an outer integument enclosing an oil base fluid material within which said fruit-flavored non-bread material is present in crystalline form.

7. The article of claim 1 wherein said capsule of fruit-flavored non-bread material includes alcohol.

8. A storable wholly edible article for ceremonial religious ingestion, said article consisting of two components of discrete shape interlocked and unified together with each component visible to the naked eye on visual inspection of said article, one of said components consisting of crisp unleavened bread material and the other of said components consisting of a single unitary structure in the form of a capsule of fruit-flavored non-bread material, said capsule being of a darker color than said bread material and having a predetermined shape, said capsule having a constricted waist portion with bulbous enlargements on opposite sides of said waist portion, the total volume of said bread material in said article being in the form of a substantially flat planar stucture of wafer-thin thickness extending outwardly from said capsule from a snug abutment against said constricted waist portion of said capsule, said bulbous enlargements on opposite sides of said waist portion being located on opposite sides of said flat wafer-thin planar structure with said capsule being locked in said planar structure, said bread material of said flat wafer-thin planar structure occupying more than 75 percent of the total area of a two-dimensional plane struck through said article at a location within and bisecting said flat wafer-thin planar structure, said waist portion of said capsule being intersected by said two-dimensional plane, the thickness of said article being greatest at the location of said capsule, all other portions of said article being of wafer-thin thickness not exceeding two millimeters.

9. A storable wholly edible article for ceremonial religious ingestion, said article consisting of two components of discrete shape interlocked and unified together with each component visible to the naked eye on visual inspection of said article, one of said components consisting of crisp unleavened bread material and the other of said components consisting of a single unitary structure in the form of a capsule of fruit-flavored non-bread material, said capsule being of a darker color than said bread material and having a predetermined shape, at least 80 percent of the total volume of said bread material in said article being in the form of a substantially flat planar structure of wafer-thin thickness extending outwardly from said capsule, said bread material of said flat wafer-thin planar structure occupying more than 75 percent of the total area of a two-dimensional plane struck through said article at a location within and bisecting said flat wafer-thin planar structure, said capsule being at a location intersected by said two-dimensional plane and being completely enclosed within film coverings of said bread material on opposite sides thereof, said film coverings of bread material being unitary with said bread material of said flat wafer-thin planar structure, at least a portion of said film coverings of said bread material enclosing said capsule being sufficiently translucent to permit visual identification therethrough of the presence of said capsule, the thickness of said article being greatest at the location of said capsule, all other portions of said article being of wafer-thin thickness not exceeding two millimeters.

* * * * *